United States Patent
Lin et al.

(10) Patent No.: US 9,970,519 B2
(45) Date of Patent: May 15, 2018

(54) CIRCULATION MEMBER POSITIONING STRUCTURE FOR BALL SCREW

(71) Applicant: HIWIN TECHNOLOGIES CORP., Taichung (TW)

(72) Inventors: Ming-Yao Lin, Taichung (TW); Yu-Hua Chen, Taichung (TW); Hui-Chen Chen, Taichung (TW); Tsung-Hsien Tsai, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 162 days.

(21) Appl. No.: 14/932,686

(22) Filed: Nov. 4, 2015

(65) Prior Publication Data
US 2016/0186845 A1    Jun. 30, 2016

(30) Foreign Application Priority Data
Dec. 30, 2014    (TW) .............................. 103223326 U

(51) Int. Cl.
*F16H 25/22*    (2006.01)

(52) U.S. Cl.
CPC ..... *F16H 25/2223* (2013.01); *F16H 25/2219* (2013.01)

(58) Field of Classification Search
CPC ............. F16H 25/2214; F16H 25/2219; F16H 25/2223
See application file for complete search history.

(56) References Cited

U.S. PATENT DOCUMENTS

| | | | | |
|---|---|---|---|---|
| 3,327,551 A | * | 6/1967 | Prueter | F16H 25/2214 74/424.87 |
| 2007/0295132 A1 | * | 12/2007 | Lin | F16H 25/2223 74/424.86 |
| 2009/0294203 A1 | * | 12/2009 | Okada | B62D 5/0448 180/444 |
| 2011/0296939 A1 | * | 12/2011 | Kaneko | F16H 25/2214 74/424.87 |

(Continued)

FOREIGN PATENT DOCUMENTS

TW    I262268    9/2006
TW    M308347    3/2007

*Primary Examiner* — William Kelleher
*Assistant Examiner* — Gregory Prather
(74) *Attorney, Agent, or Firm* — Muncy, Geissler, Olds & Lowe, P.C.

(57) ABSTRACT

A circulation member positioning structure for a ball screw includes a nut and a circulation member. The nut has a threaded channel, a socket, and a positioning notch. The socket is provided on a wall of the threaded channel and the positioning notch is provided on a wall of socket. The circulation member has a circulation portion, a circulation track, and a positioning protrusion. The circulation portion is provided in the socket of the nut. The circulation track is distributed over one lateral of the circulation portion and connects with the threaded channel of the nut. The positioning protrusion is provided on an opposite lateral of the circulation portion for being engaged with the positioning notch of the nut. Thereby, the circulation member positioning structure helps to simplify the assembling work of the circulation member and to remain the nut small despite the insertion of the circulation member.

4 Claims, 6 Drawing Sheets

(56) References Cited

U.S. PATENT DOCUMENTS

| | | | | |
|---|---|---|---|---|
| 2012/0192667 A1* | 8/2012 | Chen | ............ | F16H 25/2219 74/424.82 |
| 2013/0283953 A1* | 10/2013 | Iwasaki | ............ | F16H 25/2219 74/424.87 |
| 2014/0182407 A1* | 7/2014 | Lin | ............ | F16H 25/2214 74/424.86 |
| 2015/0362050 A1* | 12/2015 | Kuo | ............ | F16H 25/2214 74/424.85 |

* cited by examiner

US 9,970,519 B2

CIRCULATION MEMBER POSITIONING STRUCTURE FOR BALL SCREW

BACKGROUND OF THE INVENTION

1. Technical Field

The present invention relates to ball screws, and more particularly to a circulation member positioning structure for a ball screw.

2. Description of Related Art

A ball screw provides highly precise linear transmission in virtue of the steel balls rolling between a screw and a nut. For keeping the steel balls continuously circulating, the ball screw is provided with a circulation member that guides the steel balls to circulate inside the nut.

For assembling such a circulation member into the nut, for example, Taiwan Patent No. M308347 involves making a screw member screwed into the nut in a radial direction of the nut so as to position the circulation member. However, the screw member can increase the outer diameter of the nut and itself needs to be tapped with threads that match with the screw member, both bringing about burdens to the manufacturing costs. Taiwan Patent No. 1262268 differently uses a C-type ring or a screw member to bind the circulation member and the nut together. However, the foregoing fixing member requires additional assembling steps and costs, and can increase the length of the nut. Hence, theses prior-art devices need to be structurally improved.

BRIEF SUMMARY OF THE INVENTION

The primary objective of the present invention is to provide a circulation member positioning structure for a ball screw, which is structurally simple and easy to assemble, and keeps the nut small.

For achieving the foregoing objective, the disclosed circulation member positioning structure comprises a nut and a circulation member. The nut has a threaded channel, a socket, and a positioning notch. The socket is provided on a wall of the threaded channel, and the positioning notch is provided on a wall of the socket. The circulation member has a circulation portion, a circulation track, and a positioning protrusion. The circulation portion is provided in the socket of the nut. The circulation track is distributed over the circulation portion and connects with the threaded channel of the nut. The positioning protrusion is provided on the circulation portion for being engaged with the positioning notch of the nut. Thereby, the circulation member can be easily assembled to the nut and is prevented from rotating with respect to the nut.

Furthermore, a relation exists between the circulation member and the nut that: $Rt \leq Ro$, where $Rt$ is a maximum distance between the positioning protrusion of the circulation member and an axis of the nut, and $Ro$ is a maximum distance between the circulation portion of the circulation member and the axis of the nut. With such a dimensional relation, the nut can keep a small outer diameter despite the provision of the positioning protrusion of the circulation member.

Preferably, the socket of the nut and the circulation portion of the circulation member each have a meniscoid cross-section. Also, another relation exists between the circulation member and the nut that: $Ro = Ra + Rp$, where $Ro$ is the maximum distance between the circulation portion of the circulation member and the axis of the nut, and $Ra$ is a distance between a center of curvature of the curved convexity of the circulation portion of the circulation member and the axis of the nut, while $Rp$ is a radius of curvature of the curved convexity of the circulation portion of the circulation member.

Preferably, the positioning protrusion of the circulation member has an outer periphery thereof extending in an axial direction of the nut while inclining toward the circulation portion of the circulation member, thereby facilitating precise assembling of the circulation member.

DETAILED DESCRIPTION OF THE INVENTION

Figure 1:
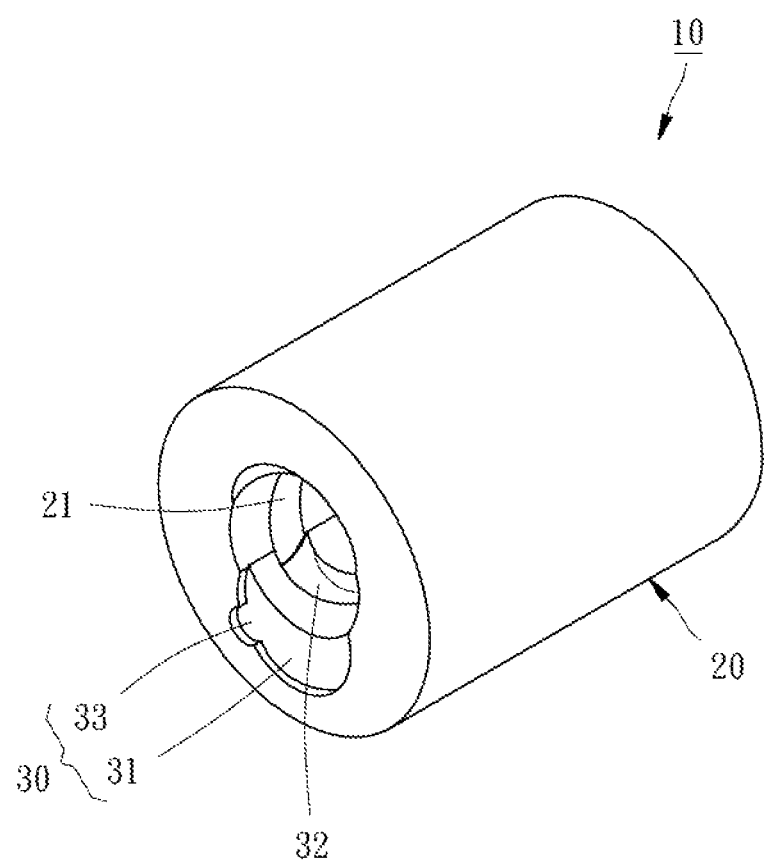
FIG. 1 is a perspective view of a positioning structure according to a first embodiment of the present invention.
Figure 2:
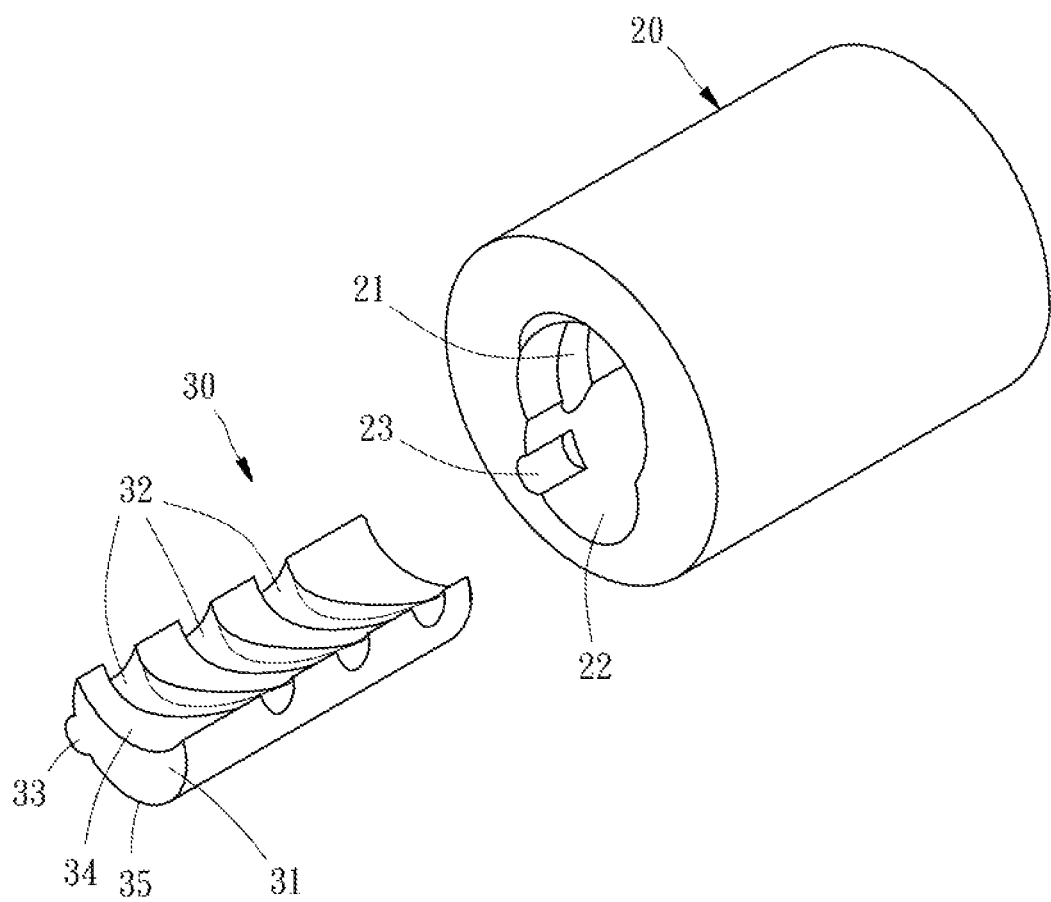
FIG. 2 is an exploded view of the structure of FIG. 1.

Referring to FIG. 1 and FIG. 2, in the first embodiment of the present invention, the circulation member positioning structure 10 comprises a nut 20 mad a circulation member 30.

The nut 20 has a threaded channel 21, a socket 22, and a positioning notch 23. The socket 22 is depressed from a wall of the threaded channel 21 in a radial direction of the nut 20 and extend inward the nut 20 in an axial direction of the nut 20. The positioning notch 23 extends along the wall of the socket 22 in the axial direction of the nut 20. In addition, the socket 22 has a meniscoid cross-section, and the positioning notch 23 has a semicircular cross-section.

The circulation member 30 has a circulation portion 31, a circulation track 32, and a positioning protrusion 33. The circulation portion 31 has a meniscoid cross-section and includes a curved concavity 34 and a curved convexity 35. The circulation track 32 is distributed over the curved concavity 34 of the circulation portion 31. The positioning protrusion 33 projects form the curved convexity 35 of the circulation portion 31 and the positioning protrusion 33 has a semicircular cross-section.

Figure 3:
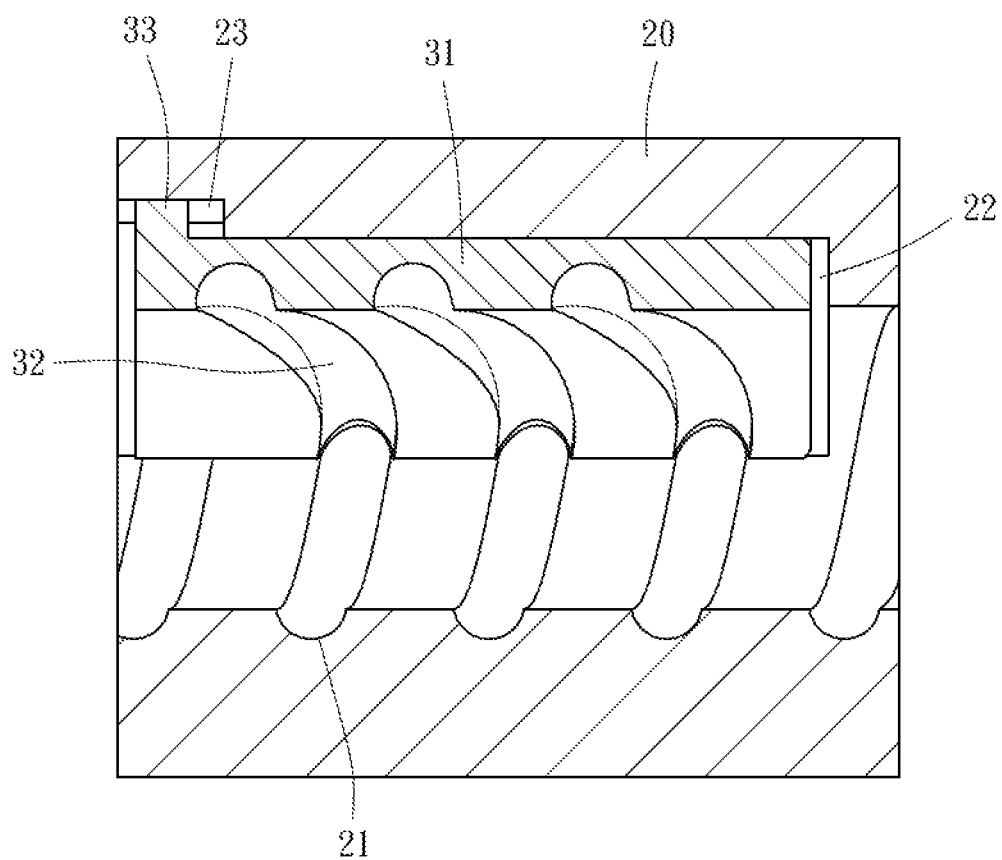
FIG. 3 is a cross-sectional view of the structure of FIG. 1.
Figure 4:
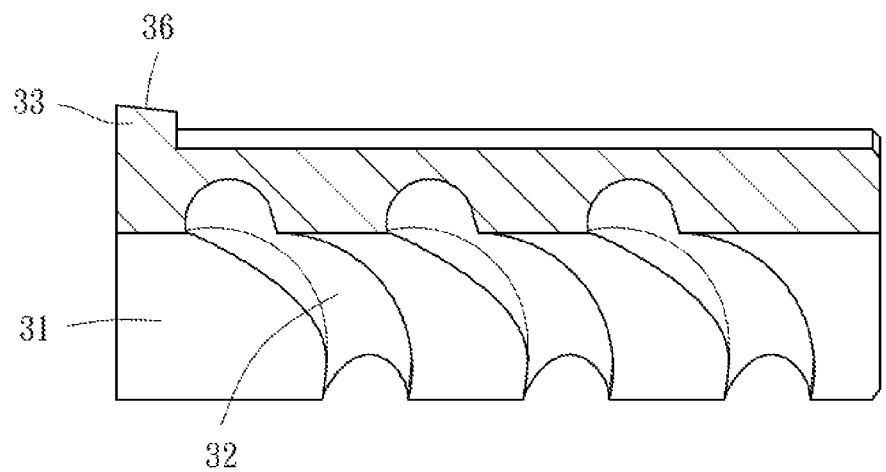
FIG. 4 is a cross-sectional view of a circulation member of the structure of FIG. 1.

To assemble the structure, as shown in FIG. 2 and FIG. 3, the circulation member 30 has the circulation portion 31 inserted into the socket 22 of the nut 20. When the structure is properly assembled, the circulation track 32 of the circulation member 30 faces and connects with the threaded channel 21 of the nut 20, so that steel balls (not shown) can roll and circulate along the circulation track 32 of the circulation member 30 and the threaded channel 21 of the nut 20. The positioning protrusion 33 of the circulation member 30 has its back facing the threaded channel 21 of the nut 20 and is engaged with the positioning notch 23 of the nut 20. With the engagement between the positioning protrusion 33 of the circulation member 30 and the positioning notch 23 of the nut 20, the circulation member 30 is prevented from rotating with respect to the nut 20. Additionally, for ensuring precise assembling of the circulation member 30, as shown in FIG. 4, the outer periphery 36 of the positioning protrusion 33 of the circulation member 30 extends in the axial direction of the nut 20 toward the circulation portion 31 of the circulation member 30. In other words, the positioning protrusion 33 of the circulation member 30 has a taper outer periphery 36.

Figure 5:
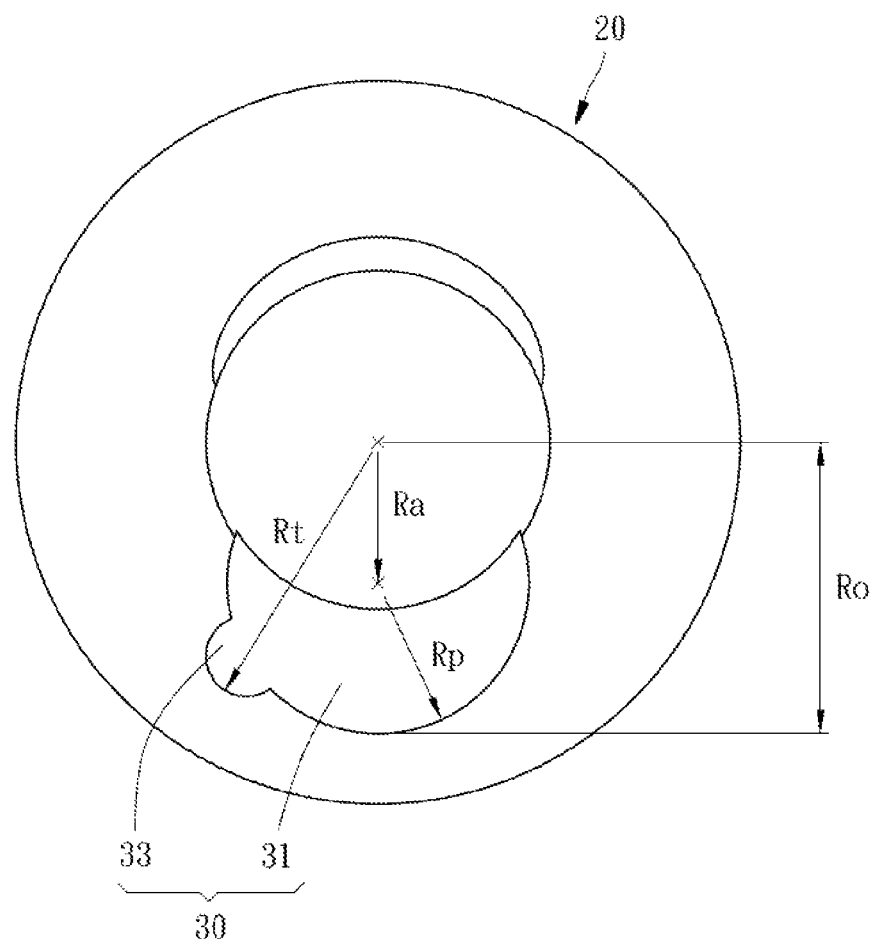
FIG. 5 is an end view of the structure of FIG. 1, showing relative dimensions between a nut and the circulation member.

On the other hand, after the structure is assembled as shown in FIG. 5, the nut 20 and the circulation member 30 satisfy the following relation: $Rt \leq Ro = Ra + Rp$. Therein, Rt is a maximum distance between the positioning protrusion 33 of the circulation member 30 and the axis of the nut 20. Ro is a maximum distance between the circulation portion 31 of the circulation member 30 and the axis of the nut 20. Ra is a distance between the center of curvature of the curved convexity 35 of the circulation portion 31 of the circulation member 30 and the axis of the nut 20. Rp is the radius of curvature of the curved convexity 35 of the circulation portion 31 of the circulation member 30. Thereby, the nut 20 can keep a small outer diameter despite the insertion of the circulation member 30.

Figure 6:
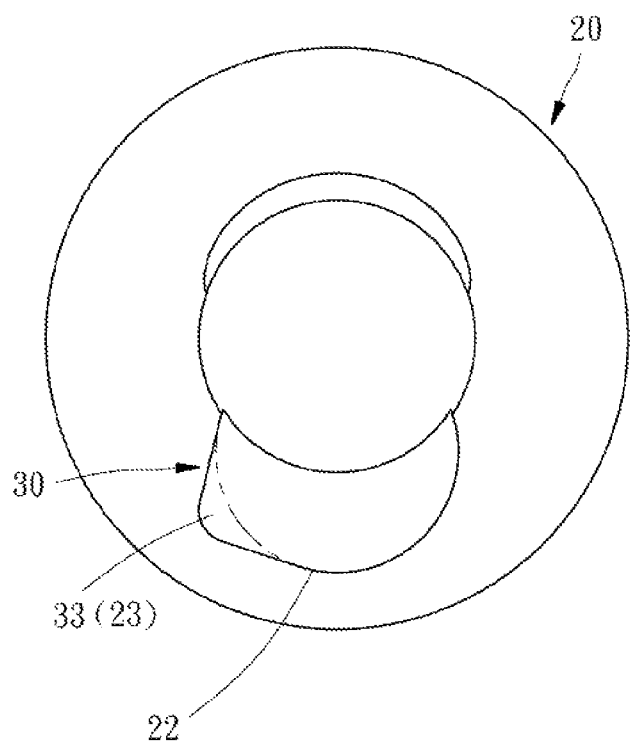
FIG. 6 is an end view of a positioning structure according to a second embodiment of the present invention.
Figure 7:
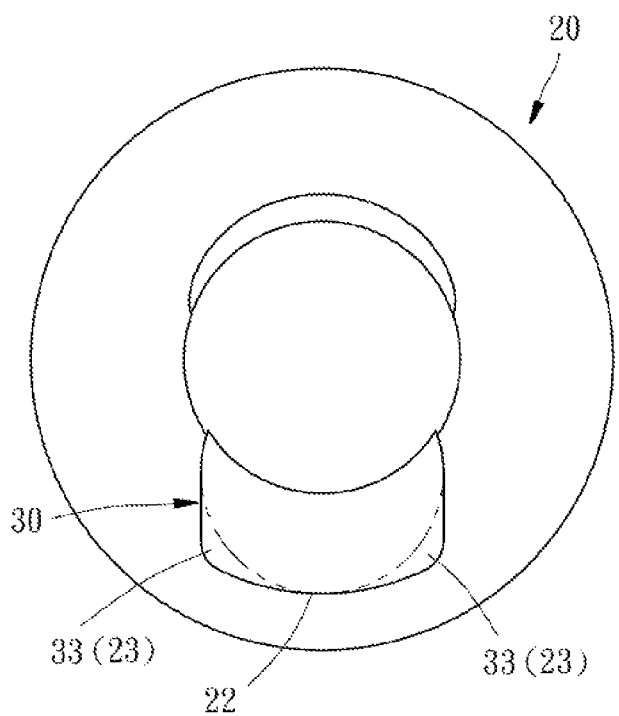
FIG. 7 is an end view of a positioning structure according to a third embodiment of the present invention.
Figure 8:
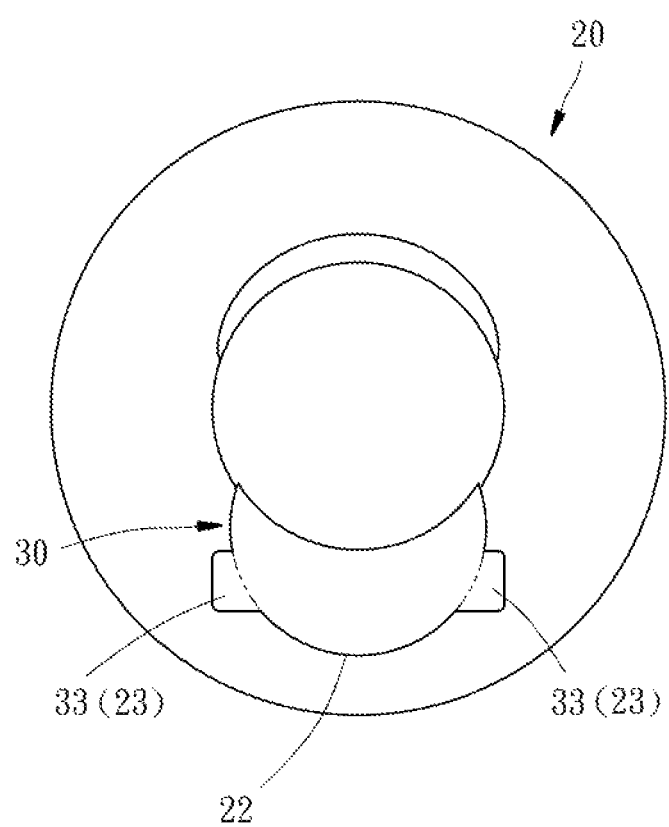
FIG. 8 is an end view of a positioning structure according to a fourth embodiment of the present invention.

It is to be further noted that the positioning notch 23 of the nut 20 and the positioning protrusion 33 of the circulation member 30 may be provided in other shapes and amounts. As shown in FIG. 6, the socket 22 of the nut 20 and the positioning protrusion 33 of the circulation member 30 may be processed into triangular shapes. As can be seen, the socket 22 is also formed with a triangular portion matching with the positioning protrusion 33. Thereby, since the triangular positioning notch 23 has its two sides tangent to the socket 22, they can be successively cut and formed, making the processing convenient. Moreover, as shown in FIG. 7, in addition to the triangular shape, the combination of the positioning notch 23 and the positioning protrusion 33 may be symmetrically provided in an amount of two, for enhancing the stability of the circulation member 30 in the socket 22. Alternatively, as shown in FIG. 8, two of the positioning notch 23 of the nut 20 and two of the positioning protrusion 33 of the circulation member 30 are symmetrically provided in rectangular shapes. Thereby, the two laterals of each of the positioning notches reliably prevent the positioning protrusion 33 therebetween from moving, so as to firmly positioning the circulation member 30 in the socket 22. As long as they are structurally matching with each other, the positioning notch 23 and the positioning protrusion 33 can be formed into various configurations without leaving the scope of the present invention.

To sum up, with the cooperation between the positioning notch 23 of the nut 20 and the positioning protrusion 33 of the circulation member 30, the circulation member 30 can be fixed to the nut 20 without using additional fixing members, so the time and costs required by the assembling work can be minimized. Moreover, with the certain dimensional relation between the nut 20 and the circulation member 30, the nut 20 can keep a small outer diameter despite the insertion of the circulation member 30, as expected by the present invention.

What is claimed is:

1. A circulation member positioning structure for a ball screw, the circulation member positioning structure comprising:

a nut, having a threaded channel, at least one socket, and a positioning notch, the socket being provided on a wall of the threaded channel, and the positioning notch being provided on a wall of the socket; and a circulation member, having a circulation portion, a circulation track, and a positioning protrusion, the circulation portion being provided in the socket of the nut, the circulation track being distributed over the circulation portion and connecting with the threaded channel of the nut, and the positioning protrusion being provided on the circulation portion so as to be engaged with the positioning notch of the nut, wherein a relation exists between the circulation member and the nut that: $Rt \leq Ro$, where Rt is a maximum distance between the positioning protrusion of the circulation member and an axis of the nut, and Ro is a maximum distance between the circulation portion of the circulation member and the axis of the nut, wherein the circulation portion of the circulation member has a curved concavity and a curved convexity, in which the circulation track is provided on the curved concavity and the positioning protrusion is provided on the curved convexity, and wherein another relation exists between the circulation member and the nut that: $Ro = Ra + Rp$, where Ro is the maximum distance between the circulation portion of the circulation member and the axis of the nut, and Ra is a distance between a center of curvature of the curved convexity of the circulation portion of the circulation member and the axis of the nut, while Rp is a radius of curvature of the curved convexity of the circulation portion of the circulation member.

2. The circulation member positioning structure of claim 1, wherein the positioning protrusion of the circulation member has an outer periphery thereof extending in an axial direction of the nut while inclining toward the circulation portion of the circulation member.

3. The circulation member positioning structure of claim 1, wherein the positioning notch of the nut and the positioning protrusion of the circulation member are both triangular.

4. The circulation member positioning structure of claim 1, wherein the positioning notch of the nut and the positioning protrusion of the circulation member are both rectangular.

* * * * *